(12) United States Patent
Tovchigrechko

(10) Patent No.: US 12,482,199 B2
(45) Date of Patent: Nov. 25, 2025

(54) REDUCING ENERGY CONSUMPTION IN EXTENDED REALITY DEVICES

(71) Applicant: Meta Platforms, Inc., Menlo Park, CA (US)

(72) Inventor: Andrey Tovchigrechko, Saratoga, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 187 days.

(21) Appl. No.: 18/458,682

(22) Filed: Aug. 30, 2023

(65) Prior Publication Data

US 2025/0078414 A1 Mar. 6, 2025

(51) Int. Cl.
  G06T 19/00 (2011.01)
  G06F 1/3296 (2019.01)
  G06T 15/40 (2011.01)

(52) U.S. Cl.
  CPC .......... *G06T 19/006* (2013.01); *G06F 1/3296* (2013.01); *G06T 15/40* (2013.01)

(58) Field of Classification Search
  CPC ..... G06T 19/006; G06T 15/40; G06F 1/3296; G06F 3/013; G06F 3/011; G06F 1/3265; G06F 1/163
  See application file for complete search history.

(56) References Cited

U.S. PATENT DOCUMENTS

| | | |
|---|---|---|
| 11,260,300 B2 | 3/2022 | Zeng |
| 11,381,743 B1 | 7/2022 | Mahbub et al. |
| 2016/0131904 A1* | 5/2016 | Border ............... G02B 27/0176 345/8 |
| 2018/0054611 A1* | 2/2018 | Shin ........................ G06F 1/163 |
| 2018/0059779 A1 | 3/2018 | Sisbot et al. |
| 2018/0189955 A1 | 7/2018 | Moshe |
| 2020/0388073 A1* | 12/2020 | Mall ..................... H04N 5/2224 |
| 2021/0218936 A1 | 7/2021 | Meitav et al. |
| 2021/0366142 A1 | 11/2021 | Grossinger et al. |

FOREIGN PATENT DOCUMENTS

JP 2021043752 A 3/2021

OTHER PUBLICATIONS

EPO—European Search Report for European Patent Application No. 24176383.8, dated Nov. 3, 2024, 7 pages.

Kanbara M., et al., "A Stereoscopic Video See-through Augmented Reality System Based on Real-time Vision-based Registration," Proceedings IEEE Virtual Reality 2000, Mar. 22, 2000, 8 Pages.

* cited by examiner

*Primary Examiner* — Jeffery A Brier
(74) *Attorney, Agent, or Firm* — Greenberg Traurig, LLP

(57) ABSTRACT

A method implemented by a computing device includes displaying on a display of the computing device an extended reality (XR) environment, and determining a context of the XR environment. Determining the context includes determining one or more characteristics associated with a virtual content and a scene of real-world content included within the displayed XR environment. The method further includes determining, based on the one or more characteristics, that the virtual content is displayed prominently with respect to the scene of real-world content, and in response to determining that the virtual content is displayed prominently with respect to the scene of real-world content, forgo an image processing of the scene of real-world content.

20 Claims, 8 Drawing Sheets

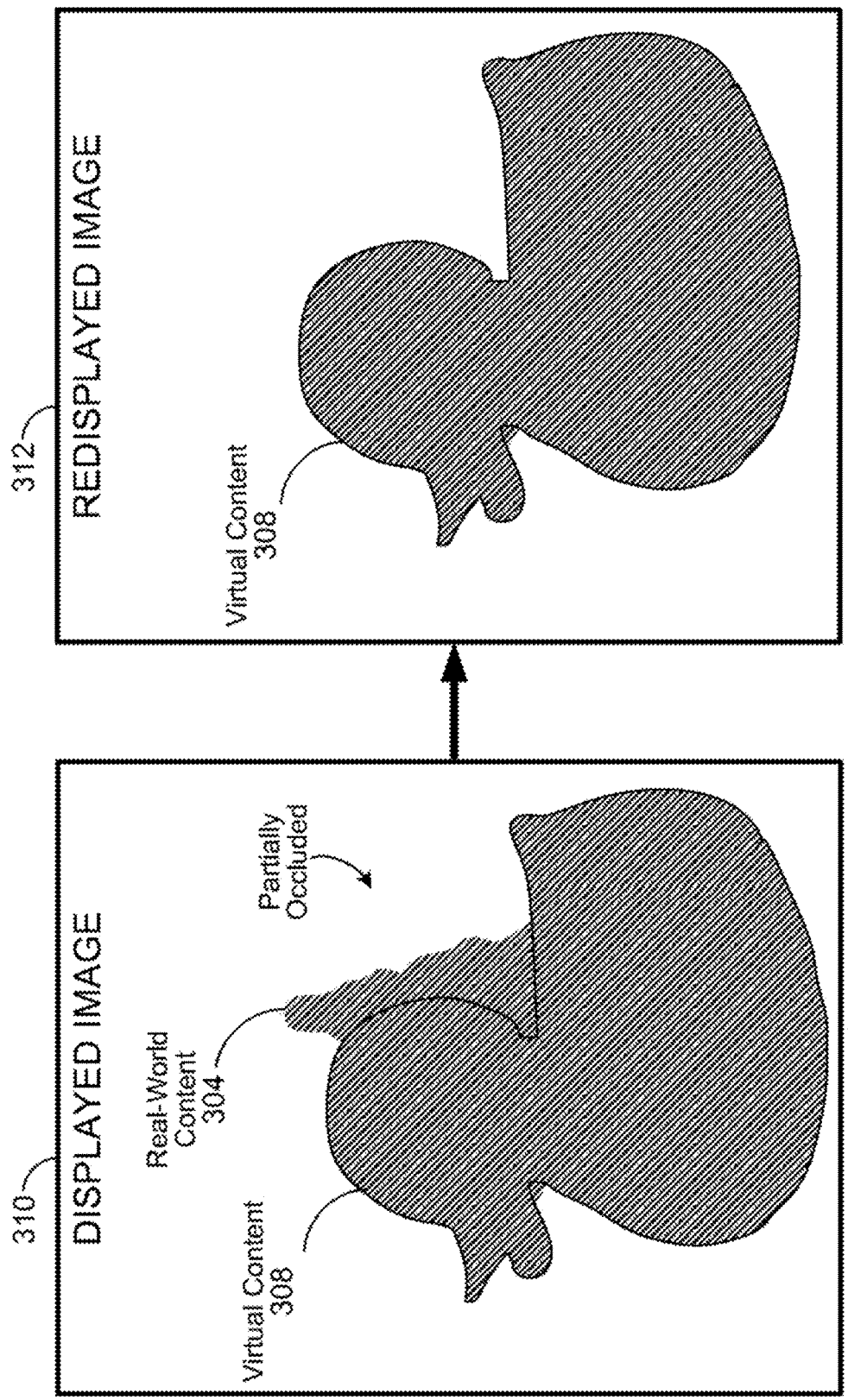

REDUCING ENERGY CONSUMPTION IN EXTENDED REALITY DEVICES

TECHNICAL FIELD

This disclosure generally relates to extended reality devices, and, more specifically, to reducing energy consumption in extended reality devices.

BACKGROUND

An extended reality (XR) system may generally include a real-world environment that includes XR content overlaying one or more features of the real-world environment. In typical XR systems, image data may be rendered on, for example, a robust head-mounted display (HMD) that may be coupled through a physical wired or wireless connection to a base graphics generation device responsible for generating the image data. However, in some instances, in which the HMD includes, for example, lightweight XR glasses and/or other wearable electronic devices as opposed to more robust headset devices, the XR glasses or other lightweight wearable electronic devices may, in comparison, include reduced processing power, low or high resolution cameras, and/or relatively simple tracking optics. Additionally, due to the smaller architectural area, the XR glasses or other lightweight wearable electronic devices may also include reduced power management (e.g., batteries, battery size) and thermal management (e.g., cooling fans, heat sinks) electronics. This may often preclude such devices from maximizing performance while reducing power consumption and thermal impact. It may be thus useful to provide techniques to improve XR systems.

SUMMARY OF CERTAIN EMBODIMENTS

The present embodiments include techniques for dynamically forgoing the image processing of the scene of real-world content occluded by virtual content and/or deactivating one or more image sensors of a computing device corresponding to a capture of a scene of real-world content occluded by virtual content. In certain embodiments, a computing device may display on a display of the computing device an extended reality (XR) environment. In certain embodiments, the computing device may determine a context of the XR environment. For example, in one embodiment, determining the context may include determining one or more characteristics associated with a virtual content and a scene of real-world content included within the displayed XR environment. In some embodiments, determining the one or more characteristics may include determining an amount of one or more of a shadow, an occlusion, a collision, a diffuse reflection, or a specular reflection associated with the virtual content and the scene of real-world content.

In certain embodiments, the computing device may include determining, based on the one or more characteristics, that the virtual content is displayed prominently with respect to the scene of real-world content. In one embodiment, determining, based on the one or more characteristics, that the virtual content is displayed prominently with respect to the scene of real-world content may include determining that the virtual content occludes a portion of the scene of real-world content. In another embodiment, determining, based on the one or more characteristics, that the virtual content is displayed prominently with respect to the scene of real-world content may include determining that the virtual content fully occludes the scene of real-world content. In certain embodiments, in response to determining that the virtual content is displayed prominently with respect to the scene of real-world content, the computing device may then deactivate one or more image sensors of the computing device.

For example, in some embodiments, the one or more image sensors may be configured to capture the scene of real-world content. In certain embodiments, the one or more image sensors comprises one or more color image sensors, one or more monochromatic image sensors, or one or more depth image sensors. In certain embodiments, deactivating the one or more image sensors may include deactivating at least one of the one or more image sensors. For example, the at least one of the one or more image sensors may be configured to capture the occluded portion of the scene of real-world content. In certain embodiments, deactivating the one or more image sensors may further include deactivating the one or more image sensors while the virtual content fully occludes the scene of real-world content, and reactivating at least one of the one or more image sensors when the virtual content does not fully occlude the scene of real-world content. In certain embodiments, in response to determining that the virtual content is displayed prominently with respect to the scene of real-world content, the computing device may redisplay on the display the XR environment without the scene of real-world content. In this way, the present embodiments may reduce an energy consumption (e.g., power consumption, thermal impact) of the computing device by dynamically forgoing the image processing of the scene of real-world content occluded by virtual content and/or deactivating one or more image sensors of a computing device corresponding to a capture of a scene of real-world content occluded by virtual content.

The embodiments disclosed herein are only examples, and the scope of this disclosure is not limited to them. Certain embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

FIGS. 3A-3F illustrates one or more running examples deactivating one or more image sensors of a computing device corresponding to a capture of a scene of real-world content occluded by virtual content or forgoing the image processing of the scene of real-world content occluded by virtual content.

DESCRIPTION OF EXAMPLE EMBODIMENTS

Figure 1:
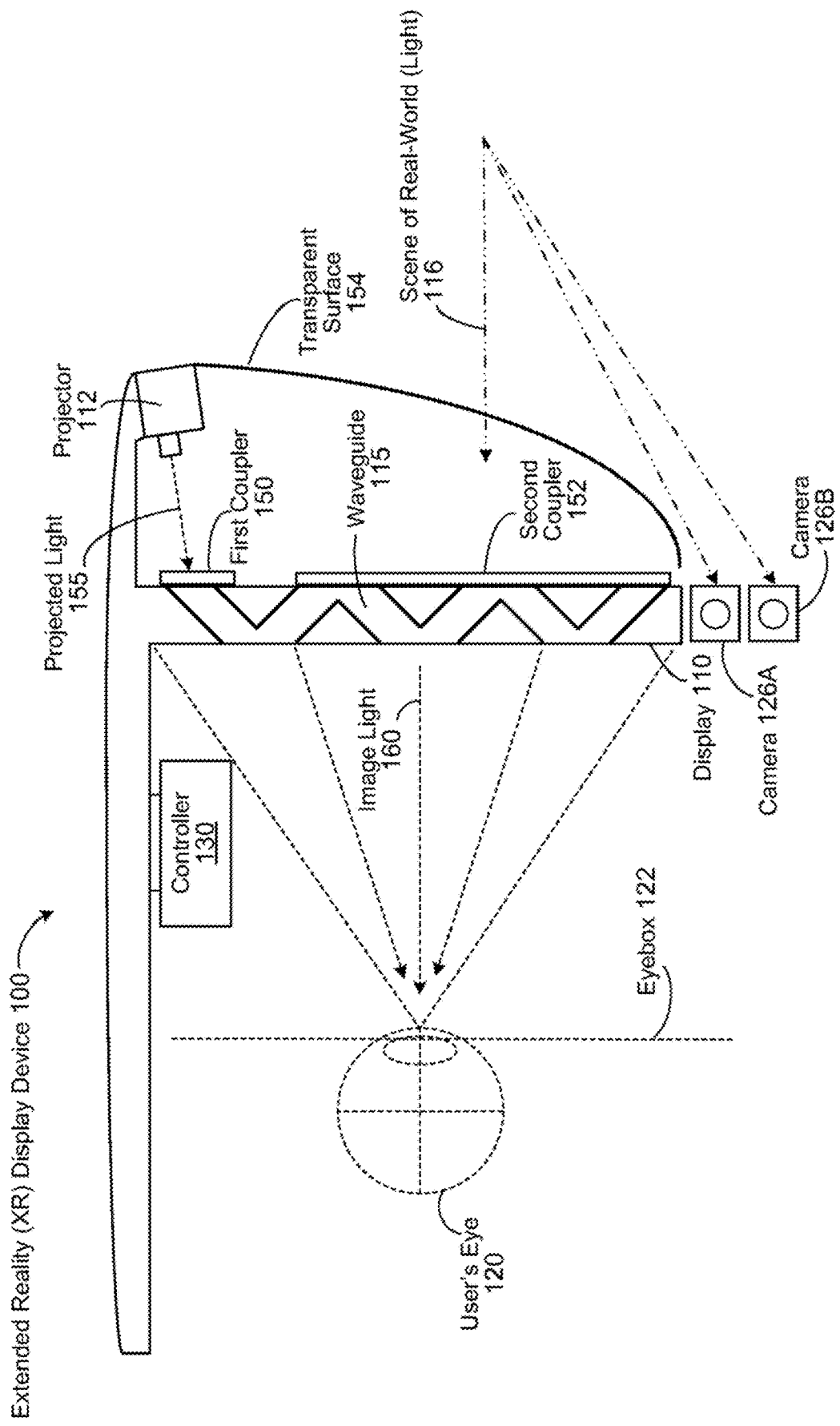
FIG. 1 illustrates an example embodiment of an extended reality (XR) system.

An extended reality (XR) system may generally include a real-world environment that includes XR content overlaying one or more features of the real-world environment. In typical XR systems, image data may be rendered on, for example, a robust head-mounted display (HMD) that may be coupled through a physical wired or wireless connection to a base graphics generation device responsible for generating the image data. However, in some instances, in which the HMD includes, for example, lightweight XR glasses and/or other wearable electronic devices as opposed to more robust headset devices, the XR glasses or other lightweight wearable electronic devices may, in comparison, include reduced processing power, low or high resolution cameras, and/or relatively simple tracking optics. Additionally, due to the smaller architectural area, the XR glasses or other lightweight wearable electronic devices may also include reduced power management (e.g., batteries, battery size) and thermal management (e.g., cooling fans, heat sinks) electronics. This may often preclude such devices from maximizing performance while reducing power consumption and thermal impact. It may be thus useful to provide techniques to improve XR systems.

Accordingly, the present embodiments include techniques for dynamically forgoing the image processing of the scene of real-world content occluded by virtual content and/or deactivating one or more image sensors of a computing device corresponding to a capture of a scene of real-world content occluded by virtual content. In certain embodiments, a computing device may display on a display of the computing device an extended reality (XR) environment. In certain embodiments, the computing device may determine a context of the XR environment. For example, in one embodiment, determining the context may include determining one or more characteristics associated with a virtual content and a scene of real-world content included within the displayed XR environment. In some embodiments, determining the one or more characteristics may include determining an amount of one or more of a shadow, an occlusion, a collision, a diffuse reflection, or a specular reflection associated with the virtual content and the scene of real-world content.

In certain embodiments, the computing device may include determining, based on the one or more characteristics, that the virtual content is displayed prominently with respect to the scene of real-world content. In one embodiment, determining, based on the one or more characteristics, that the virtual content is displayed prominently with respect to the scene of real-world content may include determining that the virtual content occludes a portion of the scene of real-world content. In another embodiment, determining, based on the one or more characteristics, that the virtual content is displayed prominently with respect to the scene of real-world content may include determining that the virtual content fully occludes the scene of real-world content. In certain embodiments, in response to determining that the virtual content is displayed prominently with respect to the scene of real-world content, the computing device may then deactivate one or more image sensors of the computing device.

For example, in some embodiments, the one or more image sensors may be configured to capture the scene of real-world content. In certain embodiments, the one or more image sensors comprises one or more color image sensors, one or more monochromatic image sensors, or one or more depth image sensors. In certain embodiments, deactivating the one or more image sensors may include deactivating at least one of the one or more image sensors. For example, the at least one of the one or more image sensors may be configured to capture the occluded portion of the scene of real-world content. In certain embodiments, deactivating the one or more image sensors may further include deactivating the one or more image sensors while the virtual content fully occludes the scene of real-world content, and reactivating at least one of the one or more image sensors when the virtual content does not fully occlude the scene of real-world content. In certain embodiments, in response to determining that the virtual content is displayed prominently with respect to the scene of real-world content, the computing device may redisplay on the display the XR environment without the scene of real-world content. In this way, the present embodiments may reduce an energy consumption (e.g., power consumption, thermal impact) of the computing device by dynamically forgoing the image processing of the scene of real-world content occluded by virtual content and/or deactivating one or more image sensors of a computing device corresponding to a capture of a scene of real-world content occluded by virtual content.

As used herein, "extended reality" may refer to a form of electronic-based reality that has been manipulated in some manner before presentation to a user, including, for example, virtual reality (VR), augmented reality (AR), mixed reality (MR), hybrid reality, simulated reality, immersive reality, holography, or any combination thereof. For example, "extended reality" content may include completely computer-generated content or partially computer-generated content combined with captured content (e.g., real-world images). In some embodiments, the "extended reality" content may also include video, audio, haptic feedback, or some combination thereof, any of which may be presented in a single channel or in multiple channels (such as stereo video that produces a three-dimensional (3D) effect to the viewer). Furthermore, as used herein, it should be appreciated that "extended reality" may be associated with applications, products, accessories, services, or a combination thereof, that, for example, may be utilized to create content in extended reality and/or utilized in (e.g., perform activities) an extended reality. Thus, "extended reality" content may be implemented on various platforms, including a head-mounted device (HMD) connected to a host computer system, a standalone HMD, a mobile device or computing system, or any other hardware platform capable of providing extended reality content to one or more viewers.

FIG. 1 illustrates a cross-section of an example XR display device 100. The XR display device 100 includes an example wearable display 110, which may include at least one waveguide 115. It should be appreciated that the XR display device 100 as illustrated is an example of one embodiment of a head-mounted display (HMD) that may be useful in reducing energy consumption, in accordance with the presently disclosed embodiments. In another embodiment, the XR display device 100 may include a see-through HMD which may not include a waveguide and may instead render images directly onto, for example, one or more transparent or semi-transparent mirrors that may be placed in front of the eyes of a user, for example. FIG. 1 also shows an eyebox 122, which is a location where a user's eye 120 may be positioned with respect to the display 110 when the user wears XR display device 100. For example, as long as the user's eye 120 is aligned with the eyebox 122, the user may be able to see a full-color image, or a pupil replication directed toward the eyebox 122 by the waveguide 115. The waveguide 115 may produce and direct many pupil replications to the eyebox 122. The waveguide 115 may be configured to direct image light 160 to the eyebox 122 located proximate to the user's eye 120. For purposes of illustration, FIG. 1 shows the cross-section associated with a single user's eye 120 and single waveguide 115. In certain embodiments, the waveguide 115 or another waveguide may provide image light to an eyebox located at another eye of the user.

In certain embodiments, the waveguide 115 may be composed of one or more materials (e.g., plastic, glass, and so forth) with one or more refractive indices that effectively minimize the weight and widen a field of view (FOV) of the display 110. In one or more embodiments, the display 110 may include one or more optical elements between the waveguide 115 and the user's eye 120. The optical elements may act to, for example, correct aberrations in the image light 160, magnify the image light 160, make some other optical adjustment of the image light 160, or perform a combination thereof. Examples of optical elements may include an aperture, a Fresnel lens, a refractive (e.g., convex and/or concave) lens, a reflective surface, a filter, or any other suitable optical element that affects image light. The waveguide 115 may include a waveguide with one or more sets of Bragg gratings, for example.

In some embodiments, the display 110 that may include a scanline or one-dimensional ("1D") waveguide display. In such an embodiment, a row of a light source may generate the light that is used to illuminate the entire vertical space (or horizontal space, where appropriate) of the display. Multiple smaller images may be combined to form a larger composite image as perceived by the viewer. A scanning element may cause the source light, treated by waveguide components, to be output to the user's eye 120 of the user in a specific pattern corresponding to a generation pattern used by the emitters to optimize display draw rate. For example, the light source may first be provided color values corresponding to a single row of pixels along the top of a display image.

In certain embodiments, the light may be transferred to the appropriate section of the eyebox 122 using a waveguide-based process assisted with a microelectromechanical system (MEMS)-powered oscillating mirror. After a short period of time, the light source may be provided color values corresponding to the next row of pixels (e.g., below the first). The light for this section of the image may then use the same process to position the color values in the appropriate position. Scanning displays may utilize less power to run and may generate less heat than traditional displays comprised of the same emitters. Scanning displays may have less weight as well, owing in part to the quality of the materials used in the scanning element and optics system. The frame rate of the display may be limited based on the oscillation speed of the mirror.

In other embodiments, the display 110 that may include a 2D or two-dimensional waveguide display. In such a display, no oscillating mirror is utilized, as a light source may be used that comprises vertical and horizontal components (e.g., in an array). Where the 1D variant lights the display on a row-by-row basis, the 2D variant may be capable of providing a significantly improved frame rate because it is not dependent on the oscillating mirror to provide for the vertical component of an image. To further improve the frame rate, the light source of a 2D waveguide display may be bonded to the controller and/or memory providing driving instructions for the display system. For example, the light source may be bonded to the memory that holds the color instructions for the display and/or the driver transistors. The result of such a configuration is that the light source for such a display may be operable with a considerably faster frame rate.

In certain embodiments, an XR display device 100 may include a light source such as a projector 112 that emits projected light 155 depicting one or more images. Many suitable display light source technologies are contemplated, including, but not limited to, liquid crystal display (LCD), liquid crystal on silicon (LCOS), light-emitting diode (LED), organic LED (OLED), micro-LED (LED), digital micromirror device (DMD), any other suitable display technology, or any combination thereof. The projected light 155 may be received by a first coupler 150 of the waveguide 115. The waveguide 115 may combine the projected light 155 with a real-world scene 116 (e.g., scene light) received by a second coupler 152. The real-world scene 116 (e.g., scene light) may be, for example, light from a real-world environment, and may pass through a transparent (or semi-transparent) surface 154 to the second coupler 152. The transparent surface 154 may be, for example, a protective curved glass or a lens formed from glass, plastic, or other transparent material.

In certain embodiments, the coupling components of the waveguide 115 may direct the projected light 155 along a total internal reflection path of the waveguide 115. Furthermore, the projected light 155 may first pass through a small air gap between the projector 112 and the waveguide 115 before interacting with a coupling element incorporated into the waveguide (such as the first coupler 150). The light path, in some examples, can include grating structures or other types of light decoupling structures that decouple portions of the light from the total internal reflection path to direct multiple instances of an image, "pupil replications," out of the waveguide 115 at different places and toward the eyebox 122 of the XR display device 100.

In certain embodiments, the scene light 116 may be seen by the user's eye 120. For example, as further depicted by FIG. 1, the XR display device 100 may include one or more cameras 126A and 126B. In certain embodiments, the one or more cameras 126A and 126B may include one or more color cameras (e.g., (R)ed, (G)reen, (B)lue cameras), one or monochromatic cameras, or one or more color depth cameras 126B (e.g., RGB-(D)epth cameras) that may be suitable for detecting or capturing the real-world scene 116 (e.g., scene light) and/or certain characteristics of the real-world scene 116 (e.g., scene light). For example, in some embodiments, in order to provide the user with an XR experience, the one or more cameras 126A and 126B may include high-resolution RGB image sensors that may be "ON" (e.g., activated) incessantly, potentially during hours the user spends in extended reality, for example. By the one or more cameras 126A and 126B being "ON" (e.g., activated) incessantly, the one or more cameras 126A and 126B may adversely impact the overall power consumption and thermal rating of the XR display device 100. As will be further appreciated below with respect to FIGS. 3A-3F and 4, the present embodiments may include dynamically deactivating the one or more cameras 126A and 126B corresponding to a capture of a scene of real-world content occluded by virtual content or forgoing the image processing of the scene of real-world content occluded by virtual content.

In certain embodiments, one or more controllers 130 may control the operations of the projector 112 and the number of cameras 126A and 126B. The controller 130 may generate display instructions for a display system of the projector 112 or image capture instructions for the one or more cameras 126A and 126B. The display instructions may include instructions to project or emit one or more images, and the image capture instructions may include instructions to capture one or more images in a successive sequence, for example. In certain embodiments, the display instructions and image capture instructions may include frame image color or monochromatic data. The display instructions and image capture instructions may be received from, for example, one or more processing devices included in the XR display device 100 of FIG. 1 or in wireless or wired communication therewith. The display instructions may further include instructions for moving the projector 112, for moving the waveguide 115 by activating an actuation system, or for moving or adjusting the lens of one or more of the one or more cameras 126A and 126B. The controller 130 may include a combination of hardware, software, and/or firmware not explicitly shown herein so as not to obscure other aspects of the disclosure.

Figure 2:
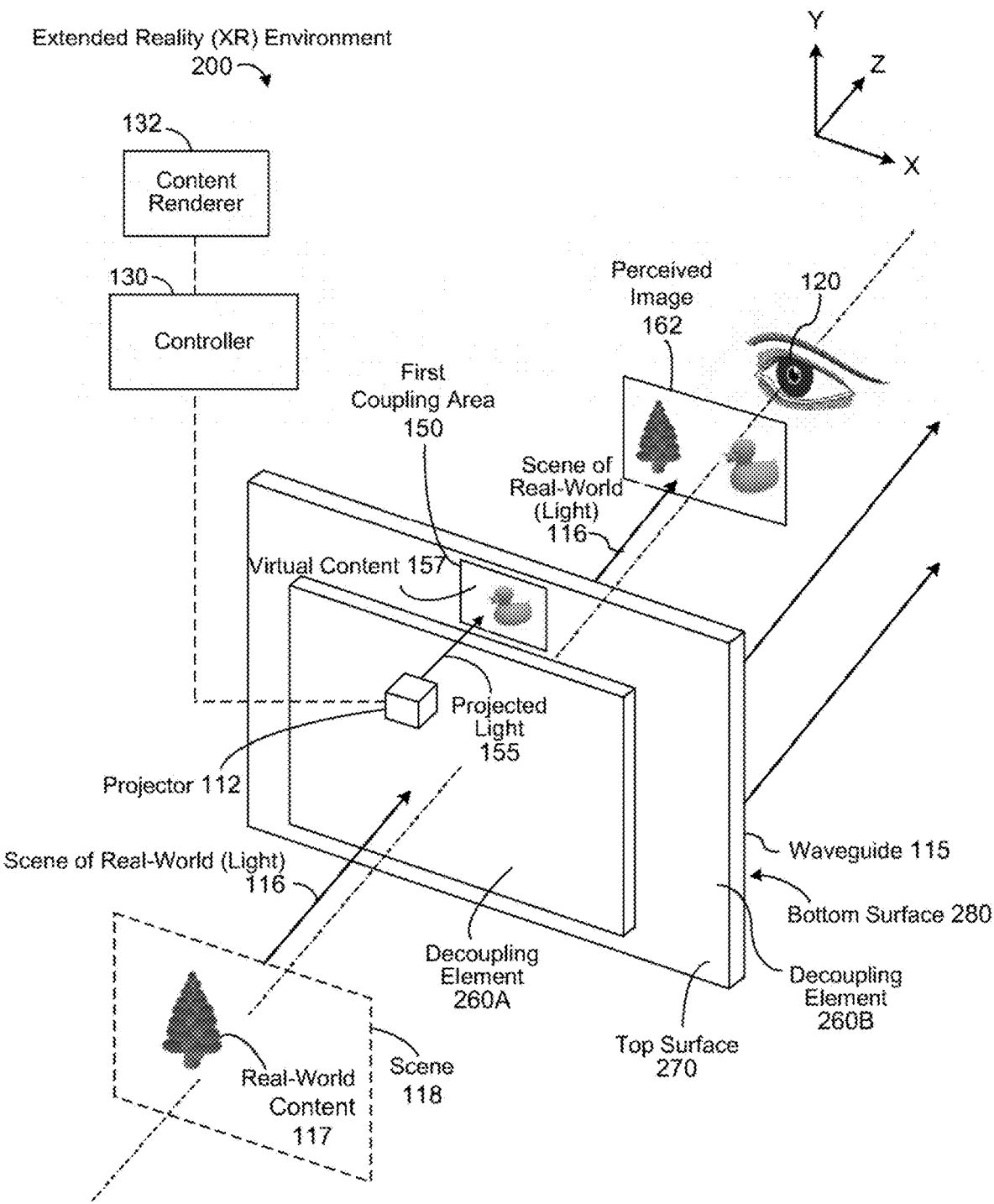
FIG. 2 illustrates an example embodiment of an XR environment.

FIG. 2 illustrates an example isometric view of an XR environment 200. In certain embodiments, the XR environment 200 may be a component of the XR display device 100. The XR environment 200 may include at least one projector 112, a waveguide 115, and a controller 130. A content renderer 132 may generate representations of content, referred to herein as AR virtual content 157, to be projected as projected light 155 by the projector 112. The content renderer 132 may send the representations of the content to the controller 130, which may in turn generate display instructions based on the content and send the display instructions to the projector 112.

For purposes of illustration, FIG. 2 shows the XR environment 200 associated with a single user's eye 120, but in other embodiments another projector 112, waveguide 115, or controller 130 that is completely separate or partially separate from the XR environment 200 may provide image light to another eye of the user. In a partially separate system, one or more components may be shared between the waveguides for each eye. In one embodiment, a single waveguide 115 may provide image light to both eyes of the user. Also, in some examples, the waveguide 115 may be one of multiple waveguides of the XR environment 200. In another embodiment, in which the HMD includes a see-through HMD, the image light may be provided onto, for example, one or more transparent or semi-transparent mirrors that may be placed in front of the eyes of the user.

In certain embodiments, the projector 112 may include one or more optical sources, an optics system, and/or circuitry. The projector 112 may generate and project the projected light 155, including at least one two-dimensional image of virtual content 157, to a first coupling area 150 located on a top surface 270 of the waveguide 115. The image light 155 may propagate along a dimension or axis toward the coupling area 150, for example, as described above with reference to FIG. 1. The projector 112 may comprise one or more array light sources. The techniques and architectures described herein may be applicable to many suitable types of displays, including but not limited to liquid crystal display (LCD), liquid crystal on silicon (LCOS), light-emitting diode (LED), organic LED (OLED), micro-LED (LED), or digital micromirror device (DMD).

In certain embodiments, the waveguide 115 may be an optical waveguide that outputs two-dimensional perceived images 162 in the real-world scene 116 (e.g., scene light with respect to a scene object 117 and scene 118) directed to the eye 120 of a user. The waveguide 115 may receive the projected light 155 at the first coupling area 150, which may include one or more coupling elements located on the top surface 270 and/or within the body of the waveguide 115 and may guide the projected light 155 to a propagation area of the waveguide 115. A coupling element of the coupling area 150 may be, for example, a diffraction grating, a holographic grating, one or more cascaded reflectors, one or more prismatic surface elements, an array of holographic reflectors, a metamaterial surface, or a combination thereof.

In certain embodiments, each of the coupling elements in the coupling area 150 may have substantially the same area along the X-axis and the Y-axis dimensions, and may be separated by a distance along the Z-axis (e.g., on the top surface 270 and the bottom surface 280, or both on the top surface 270 but separated by an interfacial layer (not shown), or on the bottom surface 280 and separated with an interfacial layer or both embedded into the body of the waveguide 115 but separated with the interfacial layer). The coupling area 150 may be understood as extending from the top surface 270 to the bottom surface 280. The coupling area 150 may redirect received projected light 155, according to a first grating vector, into a propagation area of the waveguide 115 formed in the body of the waveguide 115 between decoupling elements 260.

A decoupling element 260A may redirect the totally internally reflected projected light 155 from the waveguide 115 such that the light 155 may be decoupled through a decoupling element 260B. The decoupling element 260A may be part of, affixed to, or formed in, the top surface 270 of the waveguide 115. The decoupling element 260B may be part of, affixed to, or formed in, the bottom surface 280 of the waveguide 115, such that the decoupling element 260A is opposed to the decoupling element 260B with a propagation area extending therebetween. The decoupling elements 260A and 260B may be, for example, a diffraction grating, a holographic grating, an array of holographic reflectors, etc., and together may form a decoupling area. In certain embodiments, each of the decoupling elements 260A and 260B may have substantially the same area along the X-axis and the Y-axis dimensions and may be separated by a distance along the Z-axis.

Figure 3B:
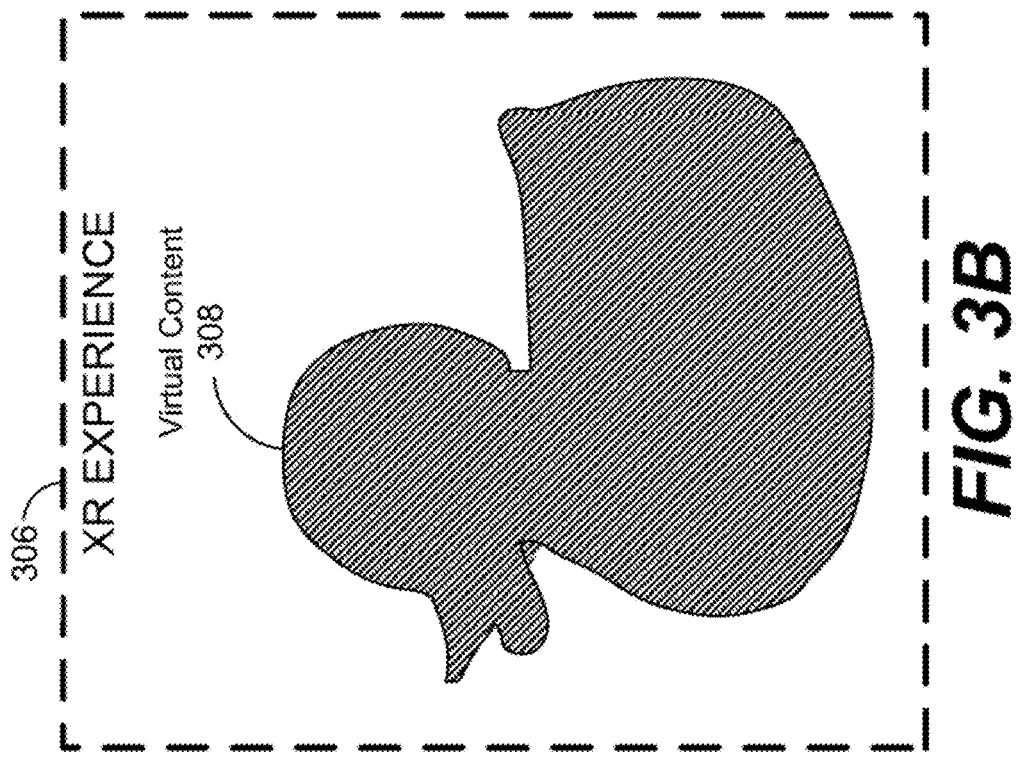
Figure 3A:
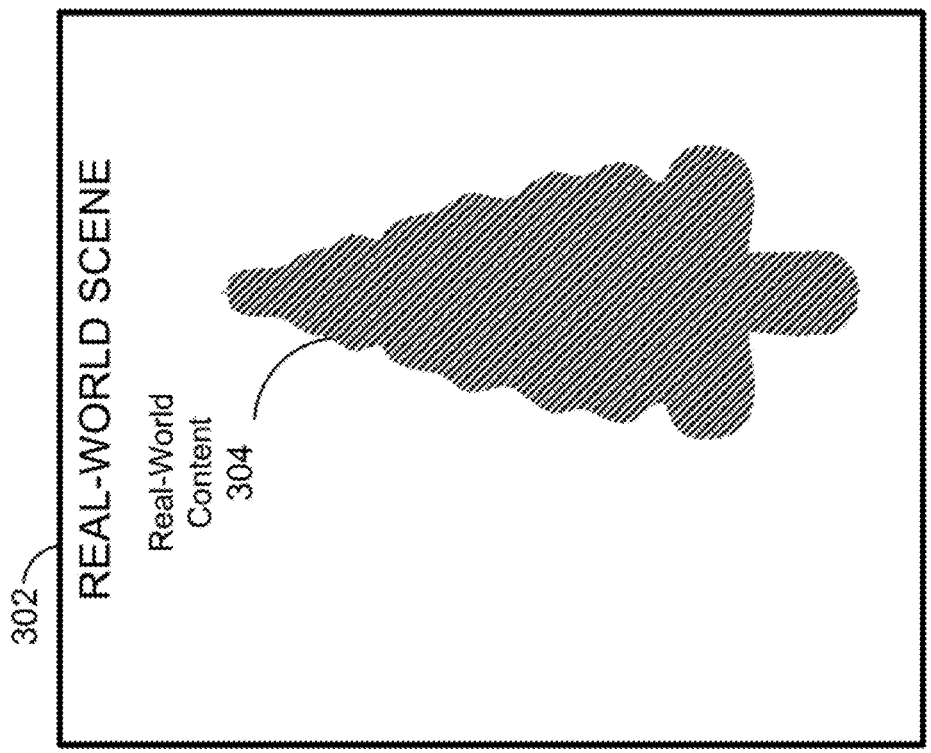

FIGS. 3A-3F illustrates one or more running examples of a result of deactivating one or more image sensors of a computing device corresponding to a capture of a scene of real-world content occluded by virtual content or forgoing the image processing of the scene of real-world content occluded by virtual content. For example, as depicted by FIG. 3A, a real-world scene 302 may be captured by the one or more cameras 126A and 126B, displayed on the display 110, and perceive by the user's eye 120. In certain embodiments, the real-world scene 302 may include real-world content 304 (e.g., an example of a tree). In certain embodiments, as depicted by FIG. 3B, an XR experience 306 may be instantiated on the XR display device 100, and the XR experience 306 may include virtual content 308 (e.g., an example of a rubber duck) that may be displayed on the display 110, and perceive by the user's eye 120. For example, in one embodiment, the real-world scene 302 including the real-world content 304 (e.g., an example of a tree) and the XR experience 306 including the virtual content 308 (e.g., an example of a rubber duck) may be displayed concurrently on the display 110 and perceived concurrently by the user's eye 120. In certain embodiments, the real-world scene 302 may include real-world content 304 (e.g., an example of a tree).

In some embodiments, the XR experience 306 including the virtual content 308 (e.g., an example of a rubber duck) may include an XR experience in which the virtual content 308 (e.g., an example of a rubber duck) may occupy a large area of the display 110 and the viewing field of the user's eye 120, such that the virtual content 308 (e.g., an example of a rubber duck) may be displayed prominently (e.g., fully occluding or partially occluding) with respect to the real-world content 304 (e.g., an example of a tree). For example, in one or more embodiments, the XR experience 306 including the virtual content 308 (e.g., an example of a rubber duck) may include a work-related XR experience, in which there may be a large pane of white space or similar space displayed on the display 110 and perceived by the user's eye 120. In another example, the XR experience 306 including the virtual content 308 (e.g., an example of a rubber duck) may include a video (e.g., movie) on a virtual screen that the user may be viewing or a virtual video game in which the real-world scene 302 including the real-world content 304 (e.g., an example of a tree) is displayed in only the peripheral area of the display 110 while the larger area of the display 110 is occupied almost entirely by the XR experience 306 including the virtual content 308 (e.g., an example of a rubber duck).

Thus, in certain embodiments, when a user of the XR display device 100 instantiates an XR experience, the XR display device 100 may determine a context of the XR experience, for example, by determining one or more characteristics (e.g., an amount of one or more of a shadow, an occlusion, a collision, a diffuse reflection, a specular reflection, and so forth) associated with the real-world scene 302 including the real-world content 304 (e.g., an example of a tree) and the XR experience 306 including the virtual content 308 (e.g., an example of a rubber duck). In certain embodiments, based on the one or more characteristics, the XR display device 100 may determine that the virtual content 308 (e.g., an example of a rubber duck) is displayed prominently (e.g., fully occluding or partially occluding) with respect to the real-world content 304 (e.g., an example of a tree).

For example, as depicted by FIG. 3C, the displayed image 310 illustrates an XR experience in which the virtual content 308 (e.g., an example of a rubber duck) is displayed prominently (e.g., fully occluding or partially occluding) with respect to the real-world content 304 (e.g., an example of a tree). In certain embodiments, in response to determining that the virtual content 308 (e.g., an example of a rubber duck) is displayed prominently (e.g., fully occluding or partially occluding) with respect to the real-world content 304 (e.g., an example of a tree), the XR display device 110 may deactivate one or more of the one or more cameras 126A and 126B because displaying the real-world content 304 (e.g., an example of a tree) in such an XR experience may be determined to be gratuitous. Thus, FIG. 3D illustrates a redisplayed image 312 in which only the virtual content 308 (e.g., an example of a rubber duck) is displayed on the display 110 and perceived by the user's eye 120. In one embodiment, the redisplayed image 312 may be generated by the XR display device 100 in response to deactivating one or more of the one or more cameras 126A and 126B or by simply forgoing the image processing of the real-world content 304 (e.g., an example of a tree).

Figures 3E, 3F:
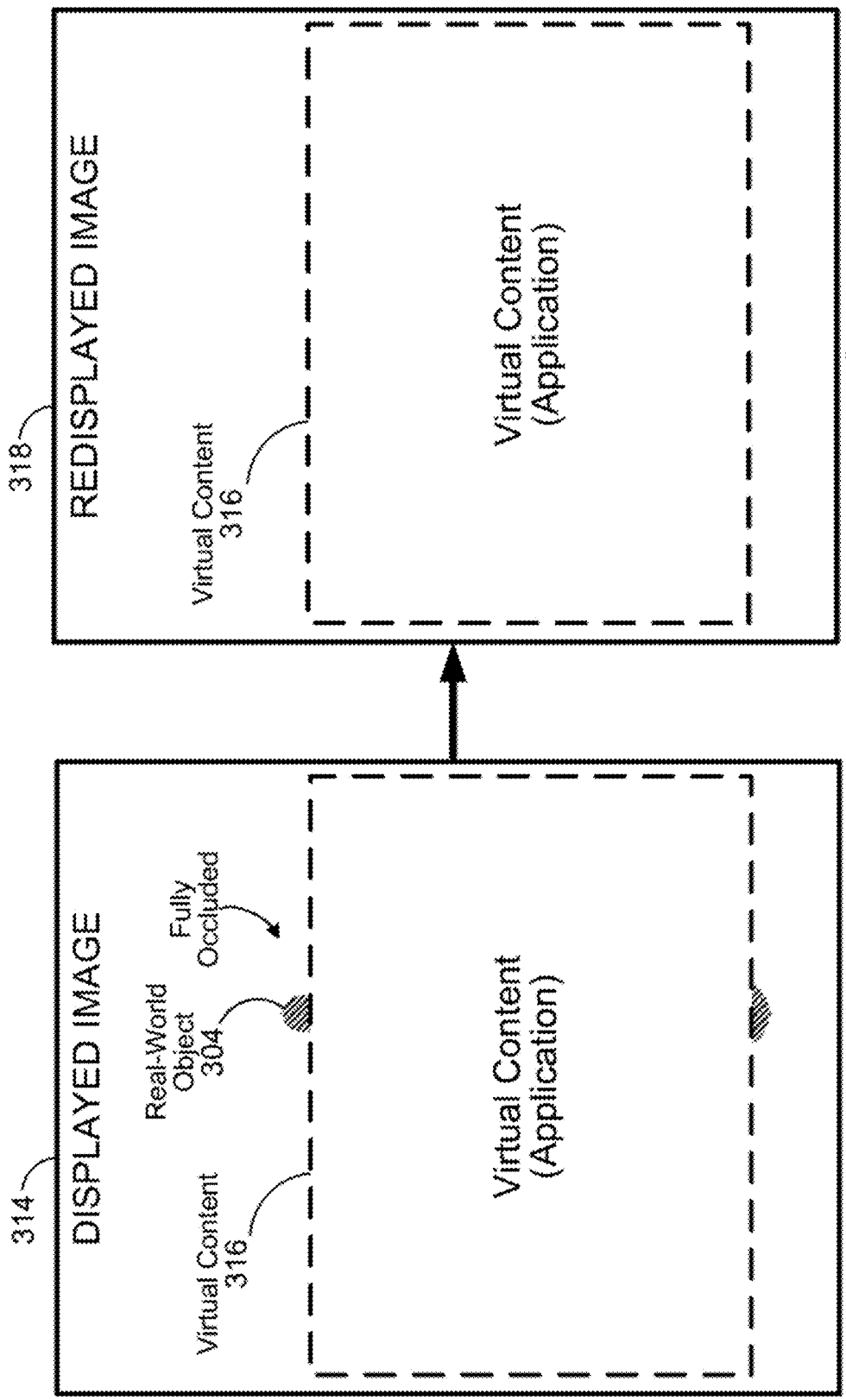

FIG. 3E depicts another example in which the displayed image 315 illustrates an XR experience in which virtual content 316 (e.g., a work-related application, a movie screening, a video game, and so forth) is displayed prominently (e.g., fully occluding or partially occluding) with respect to the real-world content 304 (e.g., an example of a tree). Thus, as similarly discussed above with respect to FIG. 3D, FIG. 3F illustrates a redisplayed image 318 in which only the virtual content 316 (e.g., a work-related application, a movie screening, a video game, and so forth) is displayed on the display 110 and perceived by the user's eye 120. The redisplayed image 316 may be generated by the XR display device 100 in response to deactivating one or more of the one or more cameras 126A and 126B or by simply forgoing the image processing of the real-world content 304 (e.g., an example of a tree).

Figure 4:
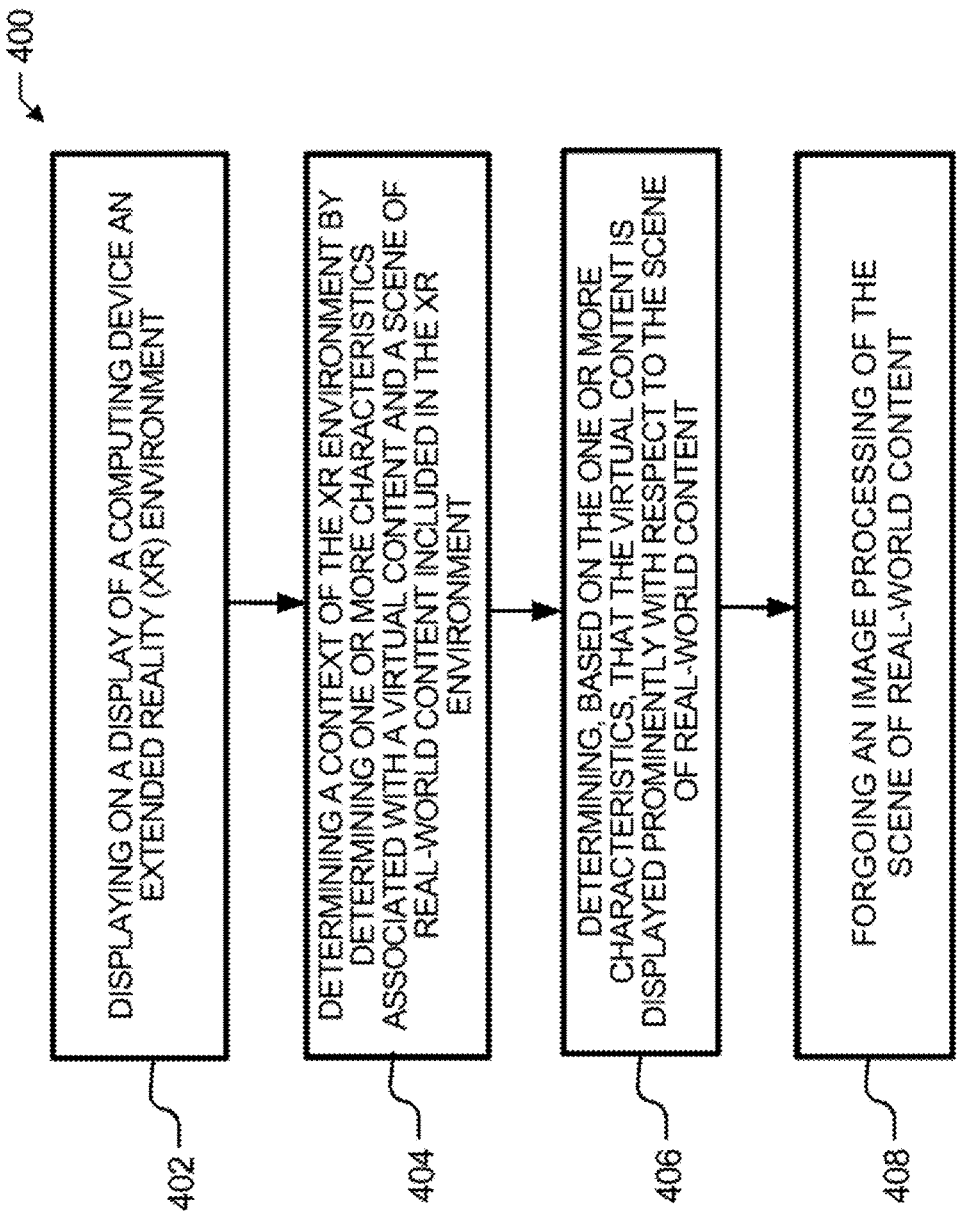
FIG. 4 illustrates a flow diagram of a method for deactivating one or more image sensors of a computing device corresponding to a capture of a scene of real-world content occluded by virtual content or forgoing the image processing of the scene of real-world content occluded by virtual content.

FIG. 4 illustrates a flow diagram of a method 400 for deactivating one or more image sensors of a computing device corresponding to a capture of a scene of real-world content occluded by virtual content or forgoing the image processing of the scene of real-world content occluded by virtual content, in accordance with presently disclosed techniques. The method 400 may be performed utilizing one or more processing devices (e.g., XR display device 100) that may include hardware (e.g., a general purpose processor, a graphic processing unit (GPU), an application-specific integrated circuit (ASIC), a system-on-chip (SoC), a microcontroller, a field-programmable gate array (FPGA), a central processing unit (CPU), an application processor (AP), a visual processing unit (VPU), a neural processing unit (NPU), a neural decision processor (NDP), or any other processing device(s) that may be suitable for processing image data), software (e.g., instructions running/executing on one or more processors), firmware (e.g., microcode), or some combination thereof.

The method 400 may begin at block 402 with one or more processing devices (e.g., XR display device 100) displaying on a display of a computing device an XR environment. The method 400 may then continue at block 404 with the one or more processing devices (e.g., XR display device 100) determining a context of the XR environment. For example, in some embodiments, determining the context may include determining one or more characteristics associated with a virtual content and a scene of real-world content included within the displayed XR environment. The method 400 may then continue at block 406 with the one or more processing devices (e.g., XR display device 100) determining, based on the one or more characteristics, that the virtual content is displayed prominently with respect to the scene of real-world content.

The method 400 may then conclude at block 408 with the one or more processing devices (e.g., XR display device 100) in response to determining that the virtual content is displayed prominently with respect to the scene of real-world content, forgoing the image processing of the scene of real-world content occluded by virtual content. For example, in one embodiment, the one or more image sensors may be configured to capture the scene of real-world content. In this way, the present embodiments may reduce an energy consumption (e.g., power consumption, thermal impact) of the XR display device 100 by dynamically forgoing the image processing of the scene of real-world content occluded by virtual content and/or deactivating one or more image sensors of a computing device corresponding to a capture of a scene of real-world content occluded by virtual content.

Figure 5:
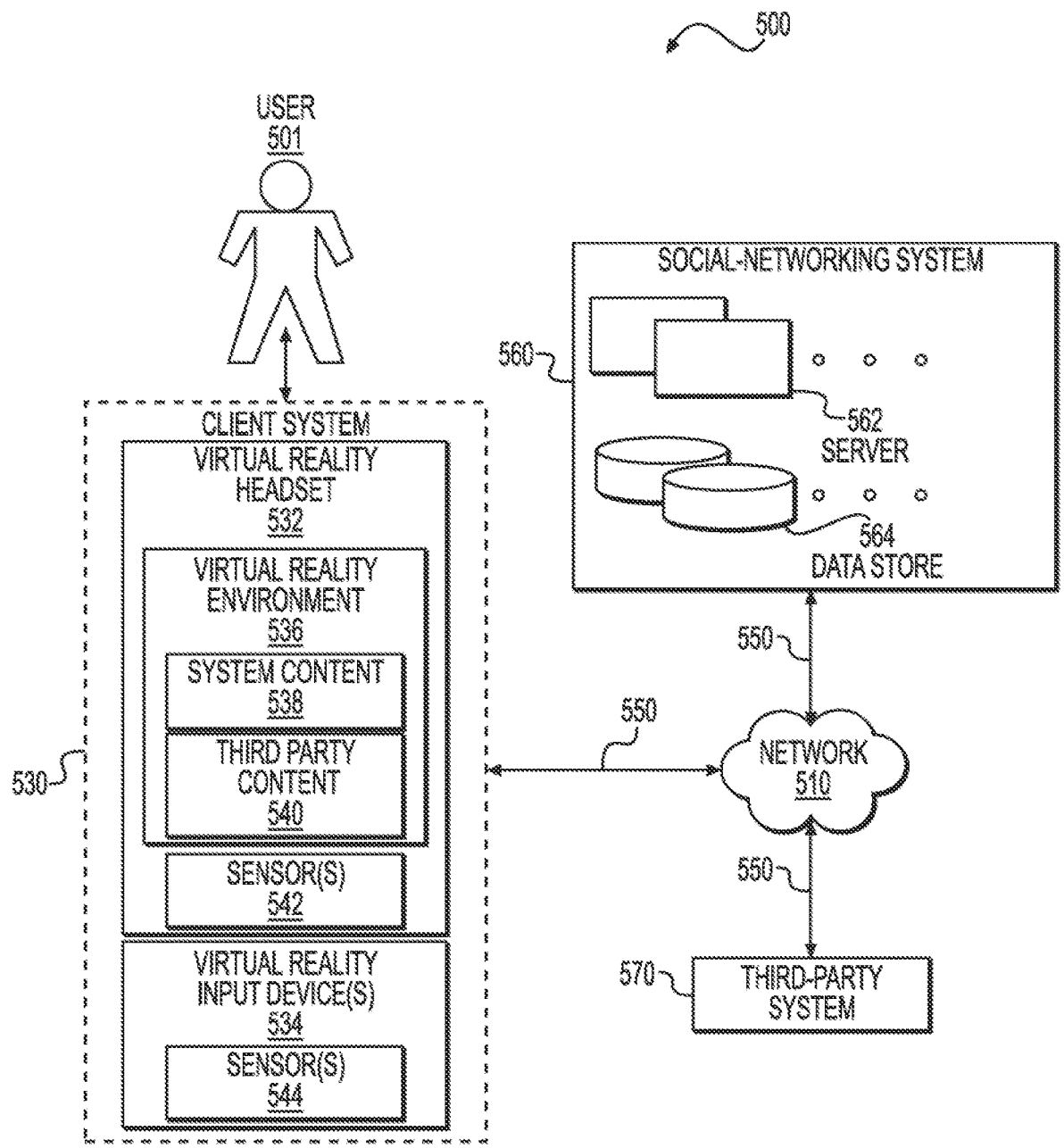
FIG. 5 illustrates an example network environment associated with a virtual reality system.

FIG. 5 illustrates an example network environment 500 associated with a virtual reality system. Network environment 500 includes a user 501 interacting with a client system 530, a social-networking system 560, and a third-party system 570 connected to each other by a network 510. Although FIG. 5 illustrates a particular arrangement of a user 501, a client system 530, a social-networking system 560, a third-party system 570, and a network 510, this disclosure contemplates any suitable arrangement of a user 501, a client system 530, a social-networking system 560, a third-party system 570, and a network 510. As an example, and not by way of limitation, two or more of users 501, a client system 530, a social-networking system 560, and a third-party system 570 may be connected to each other directly, bypassing a network 510. As another example, two or more of client systems 530, a social-networking system 560, and a third-party system 570 may be physically or logically co-located with each other in whole or in part. Moreover, although FIG. 5 illustrates a particular number of users 501, client systems 530, social-networking systems 560, third-party systems 570, and networks 510, this disclosure contemplates any suitable number of client systems 530, social-networking systems 560, third-party systems 570, and networks 510. As an example, and not by way of limitation, network environment 500 may include multiple users 501, client systems 530, social-networking systems 560, third-party systems 570, and networks 510.

This disclosure contemplates any suitable network 510. As an example, and not by way of limitation, one or more portions of a network 510 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. A network 510 may include one or more networks 510. Links 550 may connect a client system 530, a social-networking system 560, and a third-party system 570 to a communication network 510 or to each other. This disclosure contemplates any suitable links 550. In certain embodiments, one or more links 550 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In certain embodiments, one or more links 550 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 550, or a combination of two or more such links 550. Links 550 need not necessarily be the same throughout a network environment 500. One or more first links 550 may differ in one or more respects from one or more second links 550.

In certain embodiments, a client system 530 may be an electronic device including hardware, software, or embedded logic components or a combination of two or more such components and capable of carrying out the appropriate functionalities implemented or supported by a client system 530. As an example, and not by way of limitation, a client system 530 may include a computer system such as a desktop computer, notebook or laptop computer, netbook, a tablet computer, e-book reader, GPS device, camera, personal digital assistant (PDA), handheld electronic device, cellular telephone, smartphone, virtual reality headset and controllers, other suitable electronic device, or any suitable combination thereof. This disclosure contemplates any suitable client systems 530. A client system 530 may enable a network user at a client system 530 to access a network 510. A client system 530 may enable its user to communicate with other users at other client systems 530. A client system 530 may generate a virtual reality environment for a user to interact with content.

In certain embodiments, a client system 530 may include a virtual reality (or augmented reality) headset 532, and virtual reality input device(s) 534, such as a virtual reality controller. A user at a client system 530 may wear the virtual reality headset 532 and use the virtual reality input device(s) to interact with a virtual reality environment 536 generated by the virtual reality headset 532. Although not shown, a client system 530 may also include a separate processing computer and/or any other component of a virtual reality system. A virtual reality headset 532 may generate a virtual reality environment 536, which may include system content 538 (including but not limited to the operating system), such as software or firmware updates and also include third-party content 540, such as content from applications or dynamically downloaded from the Internet (e.g., web page content). A virtual reality headset 532 may include sensor(s) 542, such as accelerometers, gyroscopes, magnetometers to generate sensor data that tracks the location of the headset device 532. The headset 532 may also include eye trackers for tracking the position of the user's eyes or their viewing directions. The client system may use data from the sensor(s) 542 to determine velocity, orientation, and gravitation forces with respect to the headset.

Virtual reality input device(s) 534 may include sensor(s) 544, such as accelerometers, gyroscopes, magnetometers, and touch sensors to generate sensor data that tracks the location of the input device 534 and the positions of the user's fingers. The client system 530 may make use of outside-in tracking, in which a tracking camera (not shown) is placed external to the virtual reality headset 532 and within the line of sight of the virtual reality headset 532. In outside-in tracking, the tracking camera may track the location of the virtual reality headset 532 (e.g., by tracking one or more infrared LED markers on the virtual reality headset 532). Alternatively, or additionally, the client system 530 may make use of inside-out tracking, in which a tracking camera (not shown) may be placed on or within the virtual reality headset 532 itself. In inside-out tracking, the tracking camera may capture images around it in the real world and may use the changing perspectives of the real world to determine its own position in space.

Third-party content 540 may include a web browser, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at a client system 530 may enter a Uniform Resource Locator (URL) or other address directing a web browser to a particular server (such as server 562, or a server associated with a third-party system 570), and the web browser may generate a Hyper Text Transfer Protocol (HTTP) request and communicate the HTTP request to server. The server may accept the HTTP request and communicate to a client system 530 one or more Hyper Text Markup Language (HTML) files responsive to the HTTP request. The client system 530 may render a web interface (e.g., a webpage) based on the HTML files from the server for presentation to the user. This disclosure contemplates any suitable source files. As an example, and not by way of limitation, a web interface may be rendered from HTML files, Extensible Hyper Text Markup Language (XHTML) files, or Extensible Markup Language (XML) files, according to particular needs. Such interfaces may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a web interface encompasses one or more corresponding source files (which a browser may use to render the web interface) and vice versa, where appropriate.

In certain embodiments, the social-networking system 560 may be a network-addressable computing system that can host an online social network. The social-networking system 560 may generate, store, receive, and send social-networking data, such as, for example, user-profile data, concept-profile data, social-graph information, or other suitable data related to the online social network. The social-networking system 560 may be accessed by the other components of network environment 500 either directly or via a network 510. As an example, and not by way of limitation, a client system 530 may access the social-networking system 560 using a web browser of a third-party content 540, or a native application associated with the social-networking system 560 (e.g., a mobile social-networking application, a messaging application, another suitable application, or any combination thereof) either directly or via a network 510. In certain embodiments, the social-networking system 560 may include one or more servers 562. Each server 562 may be a unitary server or a distributed server spanning multiple computers or multiple datacenters. Servers 562 may be of various types, such as, for example and without limitation, web server, news server, mail server, message server, advertising server, file server, application server, exchange server, database server, proxy server, another server suitable for performing functions or processes described herein, or any combination thereof.

In certain embodiments, each server 562 may include hardware, software, or embedded logic components or a combination of two or more such components for carrying out the appropriate functionalities implemented or supported by server 562. In certain embodiments, the social-networking system 560 may include one or more data stores 564. Data stores 564 may be used to store various types of information. In certain embodiments, the information stored in data stores 564 may be organized according to specific data structures. In certain embodiments, each data store 564 may be a relational, columnar, correlation, or other suitable database. Although this disclosure describes or illustrates particular types of databases, this disclosure contemplates any suitable types of databases. Certain embodiments may provide interfaces that enable a client system 530, a social-networking system 560, or a third-party system 570 to manage, retrieve, modify, add, or delete, the information stored in data store 564.

In certain embodiments, the social-networking system 560 may store one or more social graphs in one or more data stores 564. In certain embodiments, a social graph may include multiple nodes—which may include multiple user nodes (each corresponding to a particular user) or multiple concept nodes (each corresponding to a particular concept)—and multiple edges connecting the nodes. The social-networking system 560 may provide users of the online social network the ability to communicate and interact with other users. In certain embodiments, users may join the online social network via the social-networking system 560 and then add connections (e.g., relationships) to a number of other users of the social-networking system 560 whom they want to be connected to. Herein, the term "friend" may refer to any other user of the social-networking system 560 with whom a user has formed a connection, association, or relationship via the social-networking system 560.

In certain embodiments, the social-networking system 560 may provide users with the ability to take actions on various types of items or objects, supported by the social-networking system 560. As an example, and not by way of limitation, the items and objects may include groups or social networks to which users of the social-networking system 560 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in the social-networking system 560 or by an external system of a third-party system 570, which is separate from the social-networking system 560 and coupled to the social-networking system 560 via a network 510.

In certain embodiments, the social-networking system 560 may be capable of linking a variety of entities. As an example, and not by way of limitation, the social-networking system 560 may enable users to interact with each other as well as receive content from third-party systems 570 or other entities, or to allow users to interact with these entities through an application programming interfaces (API) or other communication channels. In certain embodiments, a third-party system 570 may include one or more types of servers, one or more data stores, one or more interfaces, including but not limited to APIs, one or more web services, one or more content sources, one or more networks, or any other suitable components, e.g., that servers may communicate with. A third-party system 570 may be operated by a different entity from an entity operating the social-networking system 560. In certain embodiments, however, the social-networking system 560 and third-party systems 570 may operate in conjunction with each other to provide social-networking services to users of the social-networking system 560 or third-party systems 570. In this sense, the social-networking system 560 may provide a platform, or backbone, which other systems, such as third-party systems 570, may use to provide social-networking services and functionality to users across the Internet.

In certain embodiments, a third-party system 570 may include a third-party content object provider. A third-party content object provider may include one or more sources of content objects, which may be communicated to a client system 530. As an example, and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In certain embodiments, the social-networking system 560 also includes user-generated content objects, which may enhance a user's interactions with the social-networking system 560. User-generated content may include anything a user can add, upload, send, or "post" to the social-networking system 560. As an example, and not by way of limitation, a user communicates posts to the social-networking system 560 from a client system 530. Posts may include data such as status updates or other textual data, location information, photos, videos, links, music or other similar data or media. Content may also be added to the social-networking system 560 by a third-party through a "communication channel," such as a newsfeed or stream. In certain embodiments, the social-networking system 560 may include a variety of servers, sub-systems, programs, modules, logs, and data stores. In certain embodiments, the social-networking system 560 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. The social-networking system 560 may also include suitable components such as network interfaces, security mechanisms, load balancers, failover servers, management-and-network-operations consoles, other suitable components, or any suitable combination thereof.

In certain embodiments, the social-networking system 560 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example, and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking the social-networking system 560 to one or more client systems 530 or one or more third-party systems 570 via a network 510. The web server may include a mail server or other messaging functionality for receiving and routing messages between the social-networking system 560 and one or more client systems 530. An API-request server may allow a third-party system 570 to access information from the social-networking system 560 by calling one or more APIs. An action logger may be used to receive communications from a web server about a user's actions on or off the social-networking system 560.

In conjunction with the action log, a third-party-content-object log may be maintained of user exposures to third-party-content objects. A notification controller may provide information regarding content objects to a client system 530. Information may be pushed to a client system 530 as notifications, or information may be pulled from a client system 530 responsive to a request received from a client system 530. Authorization servers may be used to enforce one or more privacy settings of the users of the social-networking system 560. A privacy setting of a user determines how particular information associated with a user can be shared. The authorization server may allow users to opt in to or opt out of having their actions logged by the social-networking system 560 or shared with other systems (e.g., a third-party system 570), such as, for example, by setting appropriate privacy settings. Third-party-content-object stores may be used to store content objects received from third parties, such as a third-party system 570. Location stores may be used for storing location information received from client systems 530 associated with users. Advertisement-pricing modules may combine social information, the current time, location information, or other suitable information to provide relevant advertisements, in the form of notifications, to a user.

Figure 6:
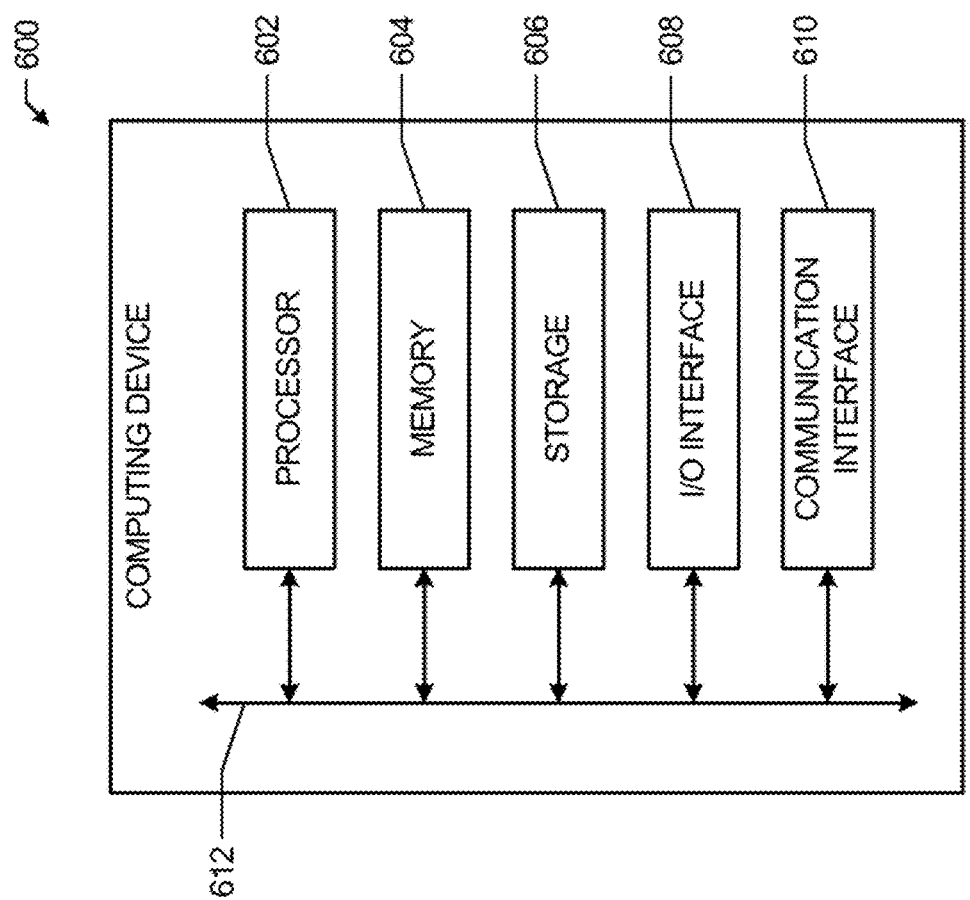
FIG. 6 illustrates an example computer system.

FIG. 6 illustrates an example computer system 600 that may be useful in performing one or more of the forgoing techniques as presently disclosed herein. In certain embodiments, one or more computer systems 600 perform one or more steps of one or more methods described or illustrated herein. In certain embodiments, one or more computer systems 600 provide functionality described or illustrated herein. In certain embodiments, software running on one or more computer systems 600 performs one or more steps of one or more methods described or illustrated herein or provides functionality described or illustrated herein. Certain embodiments include one or more portions of one or more computer systems 600. Herein, reference to a computer system may encompass a computing device, and vice versa, where appropriate. Moreover, reference to a computer system may encompass one or more computer systems, where appropriate.

This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 600 may include one or more computer systems 600; be unitary or distributed; span multiple locations; span multiple machines; span multiple data centers; or reside in a cloud, which may include one or more cloud components in one or more networks. Where appropriate, one or more computer systems 600 may perform without substantial spatial or temporal limitation one or more steps of one or more methods described or illustrated herein.

As an example, and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate. In certain embodiments, computer system 600 includes a processor 602, memory 604, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In certain embodiments, processor 602 includes hardware for executing instructions, such as those making up a computer program. As an example, and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In certain embodiments, processor 602 may include one or more internal caches for data, instructions, or addresses. This disclosure contemplates processor 602 including any suitable number of any suitable internal caches, where appropriate. As an example, and not by way of limitation, processor 602 may include one or more instruction caches, one or more data caches, and one or more translation lookaside buffers (TLBs). Instructions in the instruction caches may be copies of instructions in memory 604 or storage 606, and the instruction caches may speed up retrieval of those instructions by processor 602.

Data in the data caches may be copies of data in memory 604 or storage 606 for instructions executing at processor 602 to operate on; the results of previous instructions executed at processor 602 for access by subsequent instructions executing at processor 602 or for writing to memory 604 or storage 606; or other suitable data. The data caches may speed up read or write operations by processor 602. The TLBs may speed up virtual-address translation for processor 602. In certain embodiments, processor 602 may include one or more internal registers for data, instructions, or addresses. This disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In certain embodiments, memory 604 includes main memory for storing instructions for processor 602 to execute or data for processor 602 to operate on. As an example, and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In certain embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere).

One or more memory buses (which may each include an address bus and a data bus) may couple processor 602 to memory 604. Bus 612 may include one or more memory buses, as described below. In certain embodiments, one or more memory management units (MMUs) reside between processor 602 and memory 604 and facilitate accesses to memory 604 requested by processor 602. In certain embodiments, memory 604 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 604 may include one or more memories 604, where appropriate. Although this disclosure describes and illustrates particular memory, this disclosure contemplates any suitable memory.

In certain embodiments, storage 606 includes mass storage for data or instructions. As an example, and not by way of limitation, storage 606 may include a hard disk drive (HDD), a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In certain embodiments, storage 606 is non-volatile, solid-state memory. In certain embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In certain embodiments, I/O interface 608 includes hardware, software, or both, providing one or more interfaces for communication between computer system 600 and one or more I/O devices. Computer system 600 may include one or more of these I/O devices, where appropriate. One or more of these I/O devices may enable communication between a person and computer system 600. As an example, and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In certain embodiments, communication interface 610 includes hardware, software, or both providing one or more interfaces for communication (such as, for example, packet-based communication) between computer system 600 and one or more other computer systems 600 or one or more networks. As an example, and not by way of limitation, communication interface 610 may include a network interface controller (NIC) or network adapter for communicating with an Ethernet or other wire-based network or a wireless NIC (WNIC) or wireless adapter for communicating with a wireless network, such as a Wi-Fi network. This disclosure contemplates any suitable network and any suitable communication interface 610 for it.

As an example, and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In certain embodiments, bus 612 includes hardware, software, or both coupling components of computer system 600 to each other. As an example, and not by way of limitation, bus 612 may include an Accelerated Graphics Port (AGP) or other graphics bus, an Enhanced Industry Standard Architecture (EISA) bus, a front-side bus (FSB), a HYPER-TRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates certain embodiments as providing particular advantages, certain embodiments may provide none, some, or all of these advantages.

What is claimed is:

1. A method comprising, by a computing device:
    displaying on a display of the computing device an extended reality (XR) environment;
    determining a context of the XR environment, wherein determining the context comprising determining at least one characteristic associated with a virtual content and a scene of real-world content included within the displayed XR environment;
    determining, based on the at least one characteristic, that the virtual content is displayed prominently with respect to the scene of real-world content; and
    in response to determining that the virtual content is displayed prominently with respect to the scene of real-world content, forgoing an image processing of the scene of real-world content.

2. The method of claim 1, wherein the determining of the at least one characteristic comprising determining an amount of one or more of a shadow, an occlusion, a collision, a diffuse reflection, or a specular reflection associated with the virtual content and the scene of real-world content.

3. The method of claim 1, wherein the determining, based on the at least one characteristic, that the virtual content is displayed prominently with respect to the scene of real-world content comprising determining that the virtual content occludes a portion of the scene of real-world content.

4. The method of claim 1, further comprising:
    in response to determining that the virtual content is displayed prominently with respect to the scene of real-world content, deactivating one or more image sensors, the one or more image sensors being configured to capture the scene of real-world content.

5. The method of claim 4, wherein deactivating the one or more image sensors comprising deactivating at least one of the one or more image sensors, the at least one of the one or more image sensors being configured to capture an occluded portion of the scene of real-world content.

6. The method of claim 1, wherein determining, based on the at least one characteristic, that the virtual content is displayed prominently with respect to the scene of real-world content comprising determining that the virtual content fully occludes the scene of real-world content.

7. The method of claim 6, wherein forgoing the image processing of the scene of real-world content further comprising:
    forgoing the image processing of the scene of real-world content while the virtual content fully occludes the scene of real-world content; and executing an image processing of the scene of real-world content when the virtual content does not fully occlude the scene of real-world content.

8. The method of claim 1, further comprising:
in response to determining that the virtual content is displayed prominently with respect to the scene of real-world content, redisplaying on the display the XR environment without the scene of real-world content.

9. A computing device, comprising:
at least one display;
one or more image sensors;
one or more non-transitory computer-readable storage media including instructions; and
one or more processors coupled to the at least one display, the one or more image sensors, and the storage media, the one or more processors configured to execute the instructions to:
display on the at least one display an extended reality (XR) environment;
determine a context of the XR environment, wherein the context comprising the at least one characteristic being associated with a virtual content and a scene of real-world content included within the displayed XR environment;
determine, based on the the at least one characteristic, that the virtual content is displayed prominently with respect to the scene of real-world content; and
forgo an image processing of the scene of real-world content based on the virtual content being displayed prominently with respect to the scene of real-world content.

10. The computing device of claim 9, wherein the instructions to determine the at least one characteristic associated with the virtual content and the scene of real-world further comprising instructions to determine an amount of one or more of a shadow, an occlusion, a collision, a diffuse reflection, or a specular reflection associated with the virtual content and the scene of real-world content.

11. The computing device of claim 9, wherein the instructions to determine, based on the at least one characteristic, that the virtual content is displayed prominently with respect to the scene of real-world content further comprising instructions to determine that the virtual content occludes a portion of the scene of real-world content.

12. The computing device of claim 9, wherein the instructions further comprising instructions to:
deactivate, based on the virtual content being displayed prominently with respect to the scene of real-world content, one or more image sensors, the one or more image sensors being configured to capture the scene of real-world content.

13. The computing device of claim 12, wherein the instructions to deactivate the one or more image sensors further comprising instructions to deactivate at least one of the one or more image sensors, the at least one of the one or more image sensors being configured to capture an occluded portion of the scene of real-world content.

14. The computing device of claim 9, wherein the instructions to determine, based on the at least one characteristic, that the virtual content is displayed prominently with respect to the scene of real-world content further comprising instructions to determine that the virtual content fully occludes the scene of real-world content.

15. The computing device of claim 14, wherein the instructions to forgo the image processing of the scene of real-world content further comprising instructions to:
forgo the image processing of the scene of real-world content while the virtual content fully occludes the scene of real-world content; and
execute an image processing of the scene of real-world content when the virtual content does not fully occlude the scene of real-world content.

16. The computing device of claim 9, wherein the instructions further comprising instructions to:
redisplay on the display, based on the virtual content being displayed prominently with respect to the scene of real-world content, the XR environment without the scene of real-world content.

17. A non-transitory computer-readable medium comprising instructions that, when executed by one or more processors of a computing device, cause the computing device to:
display on a display of the computing device an extended reality (XR) environment;
determine a context of the XR environment, wherein determining the context comprising determining at least one characteristic associated with a virtual content and a scene of real-world content included within the displayed XR environment;
determine, based on the at least one characteristic, that the virtual content is displayed prominently with respect to the scene of real-world content; and
deactivate, based on the virtual content being displayed prominently with respect to the scene of real-world content, one or more image sensors of the computing device, the one or more image sensors being configured to capture the scene of real-world content.

18. The non-transitory computer-readable medium of claim 17, wherein the instructions to determine, based on the at least one characteristic, that the virtual content is displayed prominently with respect to the scene of real-world content further comprising instructions to determine that the virtual content occludes a portion of the scene of real-world content.

19. The non-transitory computer-readable medium of claim 17, wherein the instructions to determine, based on the at least one characteristic, that the virtual content is displayed prominently with respect to the scene of real-world content further comprising instructions to determine that the virtual content fully occludes the scene of real-world content.

20. The non-transitory computer-readable medium of claim 17, wherein the instructions to determine the at least one characteristic further comprising instructions to determine an amount of at least one of a shadow, an occlusion, a collision, a diffuse reflection, or a specular reflection associated with the virtual content and the scene of real-world content.

* * * * *